United States Patent
Xi (10) Patent No.: US 7,652,457 B2
(45) Date of Patent: Jan. 26, 2010

(54) SWITCHING REGULATOR CIRCUIT INCLUDING AN INDUCTOR SHUNT SWITCH

(75) Inventor: Xiaoyu Xi, Plano, TX (US)

(73) Assignee: ST-Ericsson SA, Geneva (CH)

( * ) Notice: Subject to any disclaimer, the term of this patent is extended or adjusted under 35 U.S.C. 154(b) by 477 days.

(21) Appl. No.: 11/241,286

(22) Filed: Sep. 30, 2005

(65) Prior Publication Data

US 2007/0096707 A1 May 3, 2007

(51) Int. Cl.
  *G05F 1/00* (2006.01)
(52) U.S. Cl. ......................... 323/282; 323/283
(58) Field of Classification Search .......... 323/283, 323/290, 232, 240, 271, 282, 317, 319, 351; 324/416
See application file for complete search history.

(56) References Cited

U.S. PATENT DOCUMENTS

| | | | |
|---|---|---|---|
| 5,180,964 A | | 1/1993 | Ewing |
| 6,020,729 A | * | 2/2000 | Stratakos et al. ............ 323/283 |
| 6,232,754 B1 | * | 5/2001 | Liebler et al. ............... 323/272 |
| 6,271,651 B1 | * | 8/2001 | Stratakos et al. ............ 323/282 |
| 6,430,070 B1 | | 8/2002 | Shi |
| 6,879,136 B1 | * | 4/2005 | Erisman et al. ............. 323/282 |
| 6,967,471 B2 | * | 11/2005 | Paulos ......................... 323/282 |
| 7,166,993 B2 | | 1/2007 | Shimizu et al. |
| 2005/0180068 A1 | * | 8/2005 | Lopata ......................... 361/18 |
| 2005/0264271 A1 | * | 12/2005 | Lam et al. ................... 323/282 |

* cited by examiner

*Primary Examiner*—Bao Q Vu
*Assistant Examiner*—Nguyen Tran
(74) *Attorney, Agent, or Firm*—Michael C. Martensen; William J. Kubida; Hogan & Hartson LLP (57) ABSTRACT

A switching regulator circuit includes a switching circuit that may be configured to alternately apply a supply voltage and a reference voltage to an inductor coupled between a first node and an output node. The switching regulator circuit also includes a switch such as a transistor, for example, that is coupled across the inductor. The switch may shunt the inductor when the current in the inductor reaches a predetermined current level.

27 Claims, 4 Drawing Sheets

SWITCHING REGULATOR CIRCUIT INCLUDING AN INDUCTOR SHUNT SWITCH

BACKGROUND OF THE INVENTION

1. Field of the Invention

This invention relates to switching regulators and, more particularly, to reducing spectral noise due to ringing at the output of the switching regulators.

2. Description of the Related Art

Due to their efficiency and design flexibility, switching regulators are used to provide power in a variety of applications. One common type of switching regulator is a pulse width modulated (PWM) DC-to-DC regulator, in which switched current flows in an inductor and capacitor network. A control circuit may adjust the output voltage by adjusting switching times.

Generally, two modes may be used in PWM switching regulator circuits: continuous conduction mode and discontinuous conduction mode. In continuous conduction mode, the inductor current typically ramps up to a predetermined current and is then ramped down to another point, but the inductor current is typically not allowed to ramp down to zero. Conversely, when operating in discontinuous conduction mode (DCM), the inductor current may be allowed to ramp down to zero. However, depending on the switching configuration and parasitic circuit characteristics, when the inductor current ramps to zero, the switching action may cause undesirable frequency components (e.g., ringing) in the output waveform.

In many applications, the ringing may not be especially bothersome. However, when providing power in applications such as wireless communication or high-quality audio, for example, these undesirable frequency components may be unacceptable.

SUMMARY

Various embodiments of a switching regulator circuit are disclosed. In one embodiment, the switching regulator circuit includes a switching circuit that may be configured to alternately apply a supply voltage and a reference voltage to an inductor coupled between a first node and an output node. The switched regulator circuit also includes a first switch such as a transistor, for example, that is coupled across the inductor.

In one implementation, the switching circuit includes a controller that controls the first switch. The controller may cause the first switch to close dependent upon whether the current in the inductor has reached a predetermined current value such as zero, for example.

In another implementation, the switching circuit further includes additional switches that may include a second and third switch. The controller may control the additional switches to alternately apply the supply voltage and the reference voltage to the supply node. In one specific implementation, the controller may cause the second switch to close in response to detecting a leading edge of a reference clock signal. The controller may further cause the second switch to open dependent upon whether an output voltage at the output node has reached a predetermined voltage value.

In another specific implementation, the controller may cause the third switch to close in response to detecting that an output voltage at the output node has reached a predetermined voltage value. Thus, the controller may further cause the third switch to open dependent upon whether the current in the inductor has reached the predetermined current value.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims.

DETAILED DESCRIPTION

Figure 1:
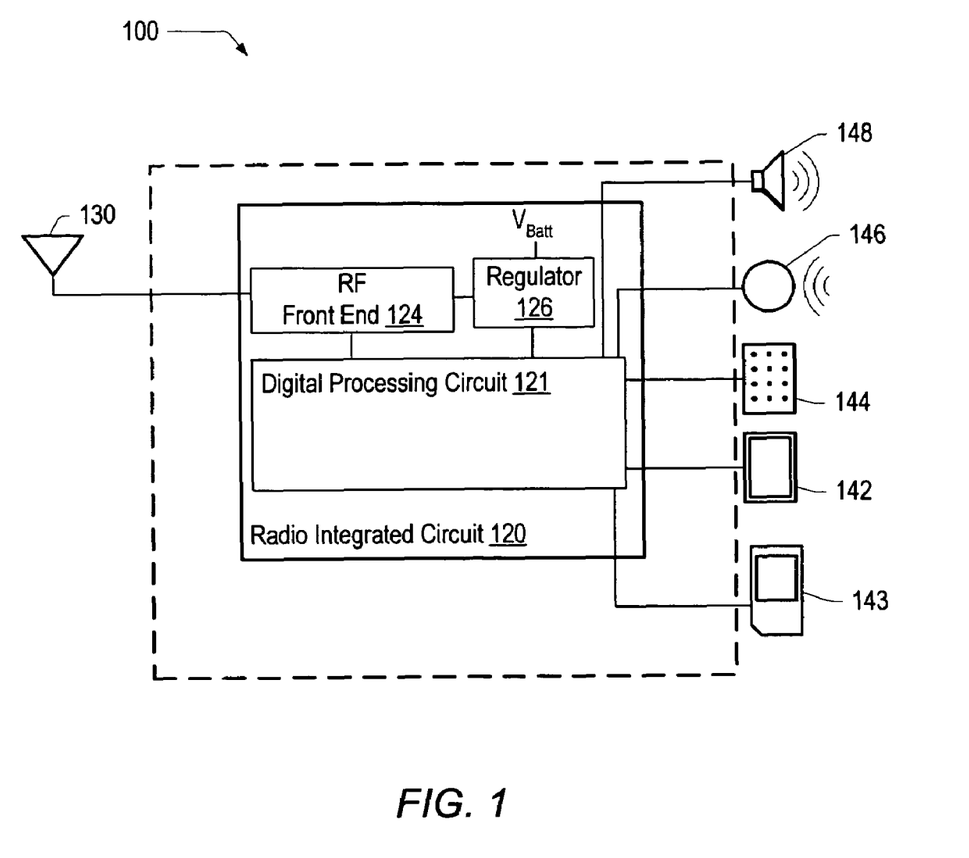
FIG. 1 is a block diagram of one embodiment of a wireless communications apparatus.

Turning now to FIG. 1, a block diagram of one embodiment of a wireless communications apparatus is shown. Communication apparatus 100 includes a radio integrated circuit 120 that is coupled to an antenna 130.

In the illustrated embodiment, the radio integrated circuit 120 includes an RF front-end circuit 124 that is coupled to a regulator circuit 126 and to a digital processing circuit 121. As shown, various user interfaces including a display 142, an authentication device 143, a keypad 144, a microphone 146, and a speaker 148 are coupled to digital processing circuit 121. However, depending upon the specific application of communication apparatus 100, other types of user interfaces may be used. As such, it is noted that in various embodiments, communication apparatus 100 may include additional components and/or couplings not shown in FIG. 1 and/or exclude one or more of the illustrated components, depending on the desired functionality.

Communication apparatus 100 is illustrative of various wireless devices including, for example, mobile and cellular phone handsets, machine-to-machine (M2M) communication networks (e.g., wireless communications for vending machines), so-called "911 phones" (a mobile handset configured for calling the 911 emergency response service), as well as devices employed in emerging applications such as 3G, satellite communications, and the like. As such, wireless communication apparatus 100 may provide RF reception functionality, RF transmission functionality, or both (i.e., RF transceiver functionality).

Communication apparatus 100 may be configured to implement one or more specific communication protocols or standards, as desired. For example, in various embodiments communication apparatus 100 may employ a time-division multiple access (TDMA) standard or a code division multiple access (CDMA) standard to implement a standard such as the Global System for Mobile Communications (GSM) standard, the Personal Communications Service (PCS) standard, and the Digital Cellular System (DCS) standard. In addition, many data transfer standards that work cooperatively with the GSM technology platform may also be supported. For example, communication apparatus 100 may also implement the General Packet Radio Service (GPRS) standard, the Enhanced Data for GSM Evolution (EDGE) standard, which may include Enhanced General Packet Radio Service standard (E-GPRS) and Enhanced Circuit Switched Data (ESCD), and the high speed circuit switched data (HSCSD) standard, among others.

In the illustrated embodiment, radio integrated circuit 120 may be a single integrated circuit that may be thought of as a radio on a chip. More particularly, in one embodiment radio integrated circuit 120 may embody many, if not all, of the components typically employed in a radio communications device. However, in some embodiments, various discreet components (not shown) used for RF filtering and antenna coupling which may not be suitable for inclusion within radio integrated circuit 120 may be external to radio integrated circuit 120.

RF front-end circuit 124 may include circuitry to provide the RF reception capability and/or RF transmission capability. In one embodiment, RF front-end circuit 124 may down-convert a received RF signal to baseband and/or up-convert a baseband signal for RF transmission. RF front-end circuit 124 may employ any of a variety of architectures and circuit configurations, such as, for example, low-IF receiver circuitry, direct-conversion receiver circuitry, direct up-conversion transmitter circuitry, and/or offset-phase locked loop (OPLL) transmitter circuitry, as desired. RF front-end circuit 124 may additionally employ a low noise amplifier (LNA) for amplifying an RF signal received at antenna 130 and/or a power amplifier for amplifying a signal to be transmitted by antenna 130. In alternative embodiments, the power amplifier may be provided external to RF front-end circuit 124 (e.g., within RF interface 110).

Digital processing circuit 121 may provide a variety of signal processing functions, as desired, including baseband functionality. For example, in one embodiment, digital processing circuit 121 may be configured to perform filtering, decimation, modulation, demodulation, coding, decoding, correlation and/or signal scaling. In addition, digital processing circuit 121 may perform other digital processing functions, such as implementation of the communication protocol stack, control of audio testing, and/or control of user I/O operations and applications. To perform such functionality, digital processing circuit 121 may include various specific circuitry, such as a software programmable MCU and/or DSP, as well as a variety of specific peripheral circuits such as memory controllers, direct memory access (DMA) controllers, hardware accelerators, voice coder-decoders (CO-DECs), digital audio interfaces (DAI), UARTs (universal asynchronous receiver transmitters), and user interface circuitry. The choice of digital processing hardware (and firmware/software, if included) depends on the design and performance specifications for a given desired implementation, and may vary from embodiment to embodiment.

In addition, as shown in FIG. 1 a regulator circuit 126 may provide a regulated supply voltage/current for circuits within radio integrated circuit 120. Accordingly, regulator circuit 126 may be representative of a switching regulator and may include circuitry that allows regulator 126 to directly use battery voltage (VBatt) as a supply voltage. More particularly, regulator circuit 126 may employ a DC-DC switching regulator that may operate in a discontinuous current mode.

As described above, operation in the discontinuous current mode may produce undesirable frequency components in the output spectrum that may be unacceptable. More particularly, since digital processing circuit 121 may perform a variety of signal processing functions as part of wireless communication apparatus 100, it may be desirable to reduce any spectral noise resulting from ringing that may be present in the output voltage of regulator circuit 126. The frequency of the ringing may be primarily determined by the parasitic capacitance. Since the parasitic capacitance may be uncontrollable, it may not be possible to remove the spectral noise using normal filtering techniques. As such, to reduce the ringing and associated frequency components in the output voltage, regulator circuit 126 may include a switch that may effectively short circuit or "shunt" an inductor within the regulator circuit during a portion of a switching cycle. Further details regarding specific implementations of regulator circuit 126 will be provided below.

Figure 2:
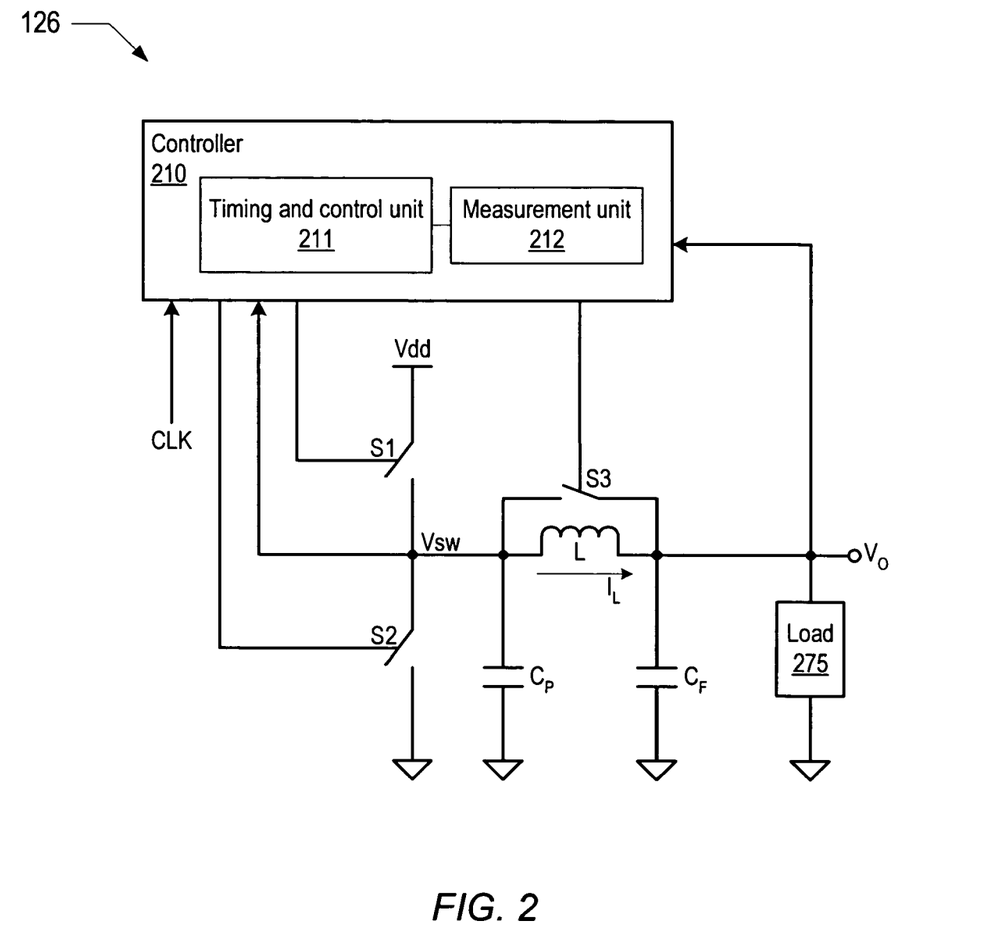
FIG. 2 is a diagram of one embodiment of the regulator circuit of FIG. 1.

Referring to FIG. 2, a diagram of one embodiment of regulator circuit 126 of FIG. 1 is shown. Regulator circuit 126 includes two switches coupled in a series arrangement between Vdd and a reference node such as circuit ground (Gnd). The switches are designated S1 and S2. The node between S1 and S2 is coupled to one side of an inductor L. The other side of inductor L is coupled to an output node. A capacitor designated $C_F$ is coupled between the output node and Gnd. Thus, the output voltage (Vo) of regulator circuit 126 is developed across capacitor $C_F$. In addition, due to parasitics that may be associated with the circuit, component and/or circuit board, a parasitic capacitance is shown coupled between the switching node and Gnd and is designated $C_P$. A third switch, S3, is connected across inductor L such that when the switch is closed, inductor L is shunted or short-circuited. Regulator circuit 126 further includes a controller 210 that is coupled to control switches S1, S2, and S3. Controller 210 is further coupled to monitor the voltage $V_O$ at the output node and the inductor current $I_L$. Regulator circuit 126 is shown coupled to a load 275.

Figure 3:
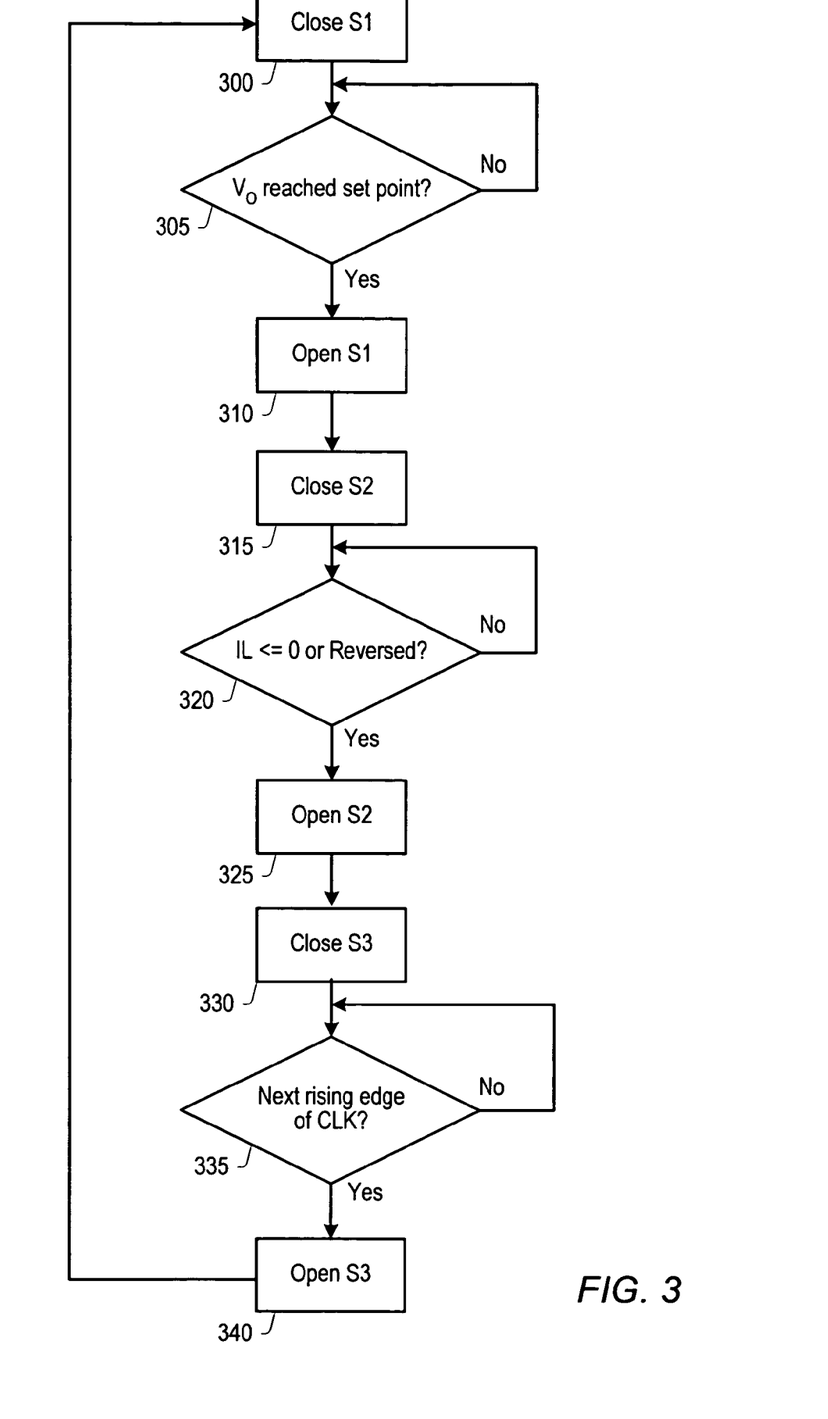
FIG. 3 is a flow diagram describing the operation of the one embodiment of the regulator circuit of FIG. 2.

In the illustrated embodiment, controller 210 may be representative of a PWM controller. However, it is contemplated that in other embodiments, controller 210 may be representative of other types of controllers. As described in greater detail below, controller 210 includes a timing and control unit 211 that may receive a reference clock signal CLK, and may control the opening and closing of switches S1, S2, and S3. In addition, controller 210 includes a measurement unit 212 that may monitor voltages and currents such as the output voltage (Vo) and inductor current $I_L$, for example. As described in greater detail below, controller 210 may provide control signals to S1, S2, and S3 based upon the CLK signal and voltages and currents monitored within the regulator circuit 126. It is noted that in one embodiment, switches S1, S2, and S3 may be implemented using transistors manufactured using a complimentary metal oxide semiconductor (CMOS) process, for example. As such, switches S1, S2, and S3 may "close" when controller 210 provides a sufficient gate voltage to the gates of each of S1, S2, and S3 causing them to conduct. FIG. 3 is a flow diagram that describes the operation of one embodiment of the regulator circuit shown in FIG. 2, and FIG. 4 is a timing diagram that illustrates exemplary waveforms of one embodiment of the regulator circuit 126.

Figure 4:
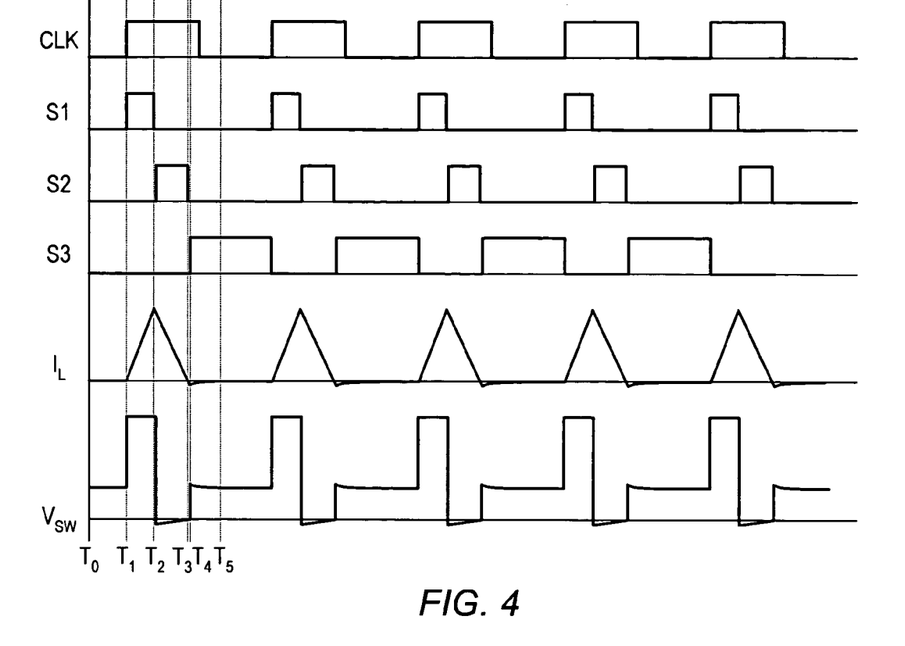
FIG. 4 is a timing diagram illustrating exemplary waveforms of one embodiment of the regulator circuit of FIG. 2.

Turning to FIG. 4, the timing diagram shows the reference clock signal CLK as the top waveform. CLK may be provided to regulator circuit 126 by any of a variety of clock generation circuits within radio integrated circuit 120. The CLK signal may be the reference clock for the switching operations within regulator circuit 126. For example, each cycle of CLK may be referred to as a switching cycle. The next waveforms are the switching signals that may be provided to switches S1, S2, and S3. It is noted that in the illustrated embodiment, each signal transitioning from a low to a high may represent the respective switch transitioning from an open position or a non-conducting state to a closed position or conducting state.

As such N-type MOS (NMOS) transistors may be used. However, in other embodiments, the signals may be inverted if other types of transistors are used. For example, if P-type MOS (PMOS) transistors are used, the waveforms would include transitions from a high to a low to represent the conducting state or closed position. The next waveform depicts an exemplary current $I_L$ through inductor L of FIG. 2. The final waveform is a representation of the voltage $V_{SW}$ that may be present at the node between S1 and S2.

Referring collectively now to FIG. 2, FIG. 3, and FIG. 4, beginning in block 300 of FIG. 3, switch S1 may close at the rising edge of the first edge of CLK. This is represented at time T1 of FIG. 4. Accordingly, the current $I_L$ may begin to ramp in a positive direction through inductor L. The ramping of the current may cause a corresponding increase in the output voltage $V_O$ across capacitor $C_F$. In addition, the voltage across of the inductor may increase substantially instantaneously as shown by the $V_{SW}$ waveform. As mentioned above, controller 210 may monitor the output voltage to determine if $V_O$ reaches an upper set point or predetermined voltage, for example (block 305). If $V_O$ reaches the setpoint, controller 210 may cause S1 to open (block 310) as illustrated at T2 of FIG. 4. In addition, controller 210 may cause S2 to close (block 315). As shown in FIG. 4, the inductor current $I_L$ may begin to ramp down in a negative direction. In addition, the voltage across of the inductor may decrease substantially instantaneously as shown by the $V_{SW}$ waveform controller 210 may monitor $I_L$ to determine when the current crosses the zero threshold (block 320). In other embodiments, controller 210 may monitor $I_L$ to determine when the current crosses some other predetermined threshold. For example, the predetermined threshold does not have to be exactly zero.

When $I_L$ crosses the zero threshold as shown at T3 of FIG. 4, controller 210 may cause S2 to open (block 325). In addition, controller 210 may cause S3 to close (block 330). However, there may be a short delay between when S2 opens and S3 closes. During that time the current $I_L$ may continue to ramp negatively. This is illustrated as the time between T3 and T4 of FIG. 4. S3 may remain closed until the next rising edge of CLK (block 335), at which time controller 210 may cause S3 to open (block 340).

It is noted that between T4 and T5 of FIG. 4, there is a small overshoot of $I_L$ and $V_{SW}$ as the inductor L is short circuited by S3. The decay time in the overshoot may be attributed to non-idealities of the switch S3. More particularly, S3 may have an associated series resistance $R_{SW}$. Thus, the time constant "τ" of the decay may be expressed as $$\tau = \frac{L}{R_{SW}} \quad (1)$$

As shown in FIG. 3, the above operations may be performed again upon the next rising edge of CLK as described above in block 300.

Thus, by shunting inductor L after the current ramps to zero, the inductor current $I_L$ is forced to circulate through switch S3, thus providing an alternative path for the inductor current and removing the inductor energy from the LC tank circuit for the reminder of the current switching cycle.

Figure 5:
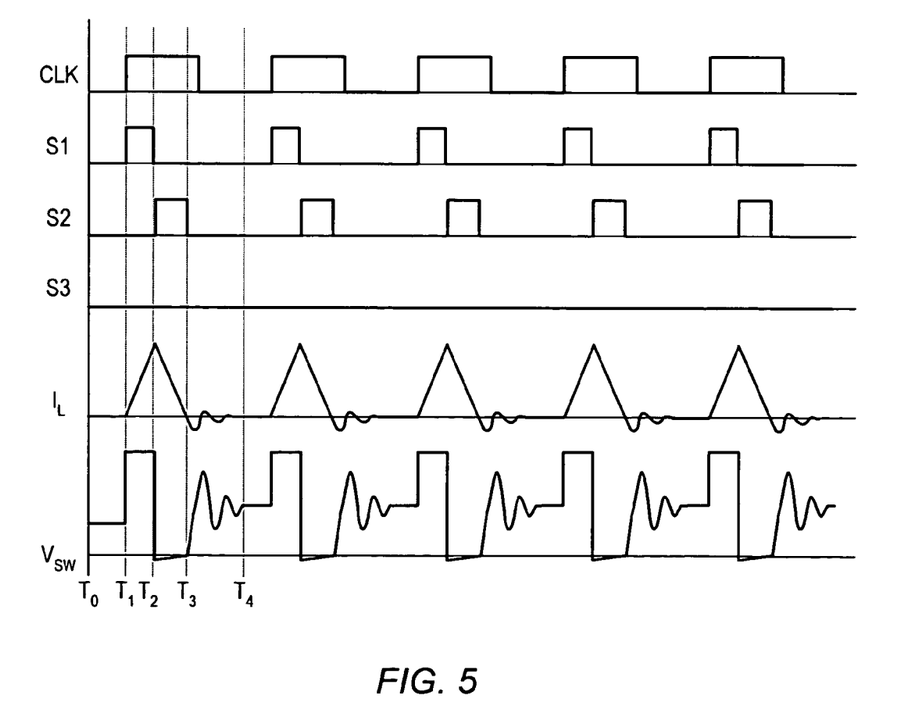
FIG. 5 is a timing diagram illustrating additional exemplary waveforms of one embodiment of the regulator circuit of FIG. 2.

FIG. 5 is a timing diagram that graphically illustrates additional exemplary waveforms of the embodiment of regulator circuit shown in FIG. 2. More particularly, for illustrative purposes, in contrast to the waveforms shown in FIG. 4, the waveforms shown in FIG. 5 are waveforms that might result if switch S3 were not closed during each switching cycle. For example, operation may be the same as that shown in FIG. 4 through T2. However at T3, when S2 opens the inductor energy from $I_L$ circulates in the LC tank circuit, which may now include the parasitic capacitor CP. As such, tank circuit attempts to resonate at its resonant frequency, which may be determined primarily $C_P$, $C_F$, and L. As noted in FIG. 5, the ringing oscillations on $I_L$ and $V_{SW}$ are relatively large in comparison to the overshoot shown in FIG. 4. The oscillations are damped, but at a decay rate that no longer has switch resistance $R_{SW}$ to aid in the decay.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A switching regulator circuit comprising:
   an inductor coupled between a first node and an output node;
   a controller configured with a reference clock signal and responsive to current passing through the inductor;
   a switching circuit responsive to the controller and configured to alternately apply a supply voltage and a reference voltage to the first node; and
   a first switch coupled across the inductor and controlled synchronous with the reference clock signal.

2. The switching regulator circuit as recited in claim 1, wherein the controller is configured to cause the first switch to close dependent upon whether a current in the inductor has reached a predetermined current value.

3. The switching regulator circuit as recited in claim 2, wherein the predetermined current value is a non-zero value.

4. The switching regulator circuit as recited in claim 2, wherein the switching circuit further includes a second switch and a third switch, and wherein the controller is coupled to control the second switch and the third switch to alternately apply the supply voltage and the reference voltage to the first node.

5. The switching regulator circuit as recited in claim 4, wherein the second switch and the third switch are coupled to the supply voltage and the reference voltage, respectively.

6. The switching regulator circuit as recited in claim 5, wherein the controller is configured to cause the second switch and the third switch to alternately open and close.

7. The switching regulator circuit as recited in claim 5, wherein the controller is configured to cause the second switch to close in response to detecting an edge of the reference clock signal, and wherein the controller is further configured to cause the second switch to open dependent upon whether an output voltage at the output node has reached a predetermined voltage value.

8. The switching regulator circuit as recited in claim 5, wherein the controller is configured to cause the third switch to close dependent upon whether an output voltage at the output node has reached a predetermined voltage value, and wherein the controller is further configured to cause the third switch to open dependent upon whether the current in the inductor has reached the predetermined current value.

9. The switching regulator circuit as recited in claim 4, wherein each of the first, second, and third switches comprises a transistor, and wherein the controller is configured to provide a respective voltage to a gate of each of the first, second and third switches.

10. A switching regulator circuit comprising:
    a first switch coupled to a supply voltage;

a second switch coupled between the first switch and a reference node;

an inductor couple to a switch node between the first switch and the second switch and to an output node;

a third switch coupled between the switch node and the output node; and a controller, responsive to current passing through the inductor, and coupled to control the first switch, the second switch, and the third switch;

wherein the controller is configured to cause the third switch to close dependent upon whether a current in the inductor has reached a predetermined current value, and wherein the controller is further configured to cause the third switch to open in response to detecting an edge of a reference clock signal.

11. The switching regulator circuit as recited in claim 10, wherein the predetermined current value is zero.

12. The switching regulator circuit as recited in claim 10, further comprising a capacitor coupled between the output node and the reference node.

13. The switching regulator circuit as recited in claim 10, wherein the controller is configured to cause the first switch to close in response to detecting an edge of a reference clock signal, and wherein the controller is further configured to cause the first switch to open dependent upon whether an output voltage has reached a predetermined voltage value.

14. The switching regulator circuit as recited in claim 13, wherein the controller is configured to cause the second switch to close dependent upon whether the output voltage has reached the predetermined voltage value, and wherein the controller is further configured to cause the second switch to open dependent upon whether the current flowing in the inductor has reached the predetermined current value.

15. The switching regulator circuit as recited in claim 10, wherein each of the first second, and third switches comprises a transistor, and wherein the controller is configured to provide a respective voltage to a gate of each of the first, second and third switches.

16. An integrated circuit for use in a wireless communication device, the integrated circuit comprising:

an inductor coupled between a first node and an output node;

a digital processing circuit; and a switching regulator circuit coupled to provide power to the digital processing circuit, wherein the switching regulator circuit includes:

a controller configured with a reference clock signal and responsive to current passing through the inductor;

a switching circuit configured to alternately apply a supply voltage and a reference voltage to the first node; and a first switch coupled across the inductor and controlled synchronous with the reference clock signal.

17. The integrated circuit as recited in claim 16, wherein the controller is configured to cause the first switch to close dependent upon whether a current in the inductor has reached a predetermined current value and to open based on an edge of the reference clock signal.

18. The integrated circuit as recited in claim 16, wherein the switching circuit further includes a second switch and a third switch, and wherein the controller is coupled to control the second switch and the third switch to alternately apply the supply voltage and the reference voltage to the first node.

19. The integrated circuit as recited in claim 18, wherein the second switch and the third switch are coupled to the supply voltage and the reference voltage, respectively.

20. The integrated circuit as recited in claim 18, wherein the controller is configured to cause the second switch and the third switch to alternately open and close.

21. The integrated circuit as recited in claim 18, wherein the controller is configured to cause the second switch to close in response to detecting an edge of the reference clock signal, and wherein the controller is further configured to cause the second switch to open dependent upon whether an output voltage at the output node has reached a predetermined voltage value.

22. The integrated circuit as recited in claim 18, wherein the controller is configured to cause the third switch to close dependent upon whether an output voltage at the output node has reached a predetermined voltage value, and wherein the controller is further configured to cause the third switch to open dependent upon whether the current in the inductor has reached the predetermined current value.

23. A method for operating a switching regulator circuit, the method comprising:

controlling a first switch and a second switch to alternately apply a supply voltage and a reference voltage to an inductor coupled to a first node and to an output node;

monitoring current passing through the inductor, and in response thereto, controlling a third switch to shunt the inductor dependent upon whether a current in the inductor has reached a predetermined current value, closing the first switch in response to detecting an edge of a reference clock signal, and concurrently opening the third switch in response to the edge of the reference clock signal.

24. The method as recited in claim 23, further comprising opening the first switch dependent upon whether an output voltage at the output node has reached a predetermined voltage.

25. The method as recited in claim 23, further comprising closing the second switch dependent upon whether an output voltage at the output node has reached a predetermined voltage value.

26. The method as recited in claim 23, further comprising opening the second switch dependent upon whether the current in the inductor has reached the predetermined current value.

27. The method as recited in claim 23, further comprising alternately opening and closing the first switch, the second switch, and the third switch.

* * * * *

UNITED STATES PATENT AND TRADEMARK OFFICE
CERTIFICATE OF CORRECTION

PATENT NO. : 7,652,457 B2  Page 1 of 1
APPLICATION NO. : 11/241286
DATED : January 26, 2010
INVENTOR(S) : Xi It is certified that error appears in the above-identified patent and that said Letters Patent is hereby corrected as shown below:

Column 7, line 3, "couple" should be --coupled--

Signed and Sealed this

Seventeenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,652,457 B2
APPLICATION NO. : 11/241286
DATED : January 26, 2010
INVENTOR(S) : Xiaoyu Xi Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 250 days.

Signed and Sealed this

Twenty-third Day of November, 2010

David J. Kappos
*Director of the United States Patent and Trademark Office*